United States Patent
Kaplan et al.

(10) Patent No.: US 10,236,132 B2
(45) Date of Patent: Mar. 19, 2019

(54) HERMETICALLY SEALED ELECTROLYTIC CAPACITOR WITH DOUBLE CASE

(71) Applicant: Cornell Dubilier Marketing, Inc., Liberty, SC (US)

(72) Inventors: James Peter Kaplan, Pickens, SC (US); Patrick William Lark, Pickens, SC (US)

(73) Assignee: Cornell-Dubilier Marketing, Inc., Liberty, SC (US)

( * ) Notice: Subject to any disclaimer, the term of this patent is extended or adjusted under 35 U.S.C. 154(b) by 0 days.

(21) Appl. No.: 15/423,655

(22) Filed: Feb. 3, 2017

(65) Prior Publication Data
US 2017/0221638 A1 Aug. 3, 2017

Related U.S. Application Data

(60) Provisional application No. 62/290,529, filed on Feb. 3, 2016.

(51) Int. Cl.
*H01G 9/02* (2006.01)
*H01G 9/04* (2006.01)
(Continued)

(52) U.S. Cl.
CPC .............. *H01G 9/10* (2013.01); *H01G 9/008* (2013.01); *H01G 9/02* (2013.01); *H01G 9/045* (2013.01);
(Continued)

(58) Field of Classification Search
CPC ............ H01G 9/10; H01G 9/008; H01G 9/02; H01G 9/045; H01G 9/145; H01G 2009/0408
(Continued)

(56) References Cited

U.S. PATENT DOCUMENTS 3,239,595 A    3/1966 Reese et al.
3,243,668 A    3/1966 Diggens
(Continued)

FOREIGN PATENT DOCUMENTS

JP    H04233714 A    8/1992
JP    2010109024 A   5/2010

OTHER PUBLICATIONS

Macomber, et al., Longlife, High-Voltage, Hermetically-Sealed Aluminum Electrolytic Capacitors, 16th Capacitor and Resistor Technology Symposium, Mar. 11-15, 1996, pp. 238-244.
(Continued)

*Primary Examiner* — Michael P McFadden
(74) *Attorney, Agent, or Firm* — Timothy J. Monahan; Monahan & Company, LLC

(57) ABSTRACT

An electrolytic capacitor is provided having an inner case housing a capacitor element and an electrolyte, which is sealed by an inner cap insulated from the body of the inner case by a gasket, with the anode terminal of the capacitor element connected to the inside face of the inner cap and an anode lead connected to the outside face of the inner cap. The inner case is placed in an outer case having a sleeve surrounding the body of the inner case and an outer cap with a hermetic seal overlaying the inner cap. An insulating spacer is positioned between the inner cap and the outer cap, whereby the spacer resists movement of the inner cap, thereby preventing outward expansion of the inner case, which otherwise might lead to failure, especially at relatively high operating temperatures.

15 Claims, 4 Drawing Sheets

(51) Int. Cl.
  *H01G 9/10* (2006.01)
  *H01G 9/008* (2006.01)
  *H01G 9/045* (2006.01)
  *H01G 9/145* (2006.01)

(52) U.S. Cl.
  CPC ..... *H01G 9/145* (2013.01); *H01G 2009/0408* (2013.01)

(58) Field of Classification Search
  USPC .......................................................... 361/517
  See application file for complete search history.

(56) References Cited

U.S. PATENT DOCUMENTS

| | | | |
|---|---|---|---|
| 3,255,386 A | 6/1966 | Millard et al. | |
| 3,273,028 A | 9/1966 | Sparkes | |
| 3,275,901 A | 9/1966 | Merritt et al. | |
| 3,275,902 A | 9/1966 | McHugh et al. | |
| 3,289,051 A | 11/1966 | Sloan | |
| 3,293,507 A | 12/1966 | Smith | |
| 3,297,918 A | 1/1967 | Booe | |
| 3,301,270 A | 1/1967 | Horn | |
| 3,341,751 A | 9/1967 | Clement | |
| 3,515,951 A | 6/1970 | Krasienko et al. | |
| 3,611,054 A | 10/1971 | Piper et al. | |
| 3,624,458 A | 11/1971 | Howell et al. | |
| 3,624,460 A | 11/1971 | Correll | |
| 3,628,104 A | 12/1971 | Markarian et al. | |
| 3,646,405 A | 2/1972 | Wallis et al. | |
| 3,684,927 A | 8/1972 | Correll | |
| 3,697,823 A | 10/1972 | Correll | |
| 3,888,260 A | 6/1975 | Fischell | |
| 3,906,311 A | 9/1975 | Shoot et al. | |
| 4,025,827 A | 5/1977 | Pellerin et al. | |
| 4,254,775 A | 3/1981 | Langer | |
| 4,296,458 A | 10/1981 | Smith et al. | |
| 4,479,168 A | 10/1984 | Green, Jr. | |
| 4,683,516 A | 7/1987 | Miller | |
| 4,987,519 A | 1/1991 | Hutchins et al. | |
| 4,992,910 A | 2/1991 | Evans | |
| 5,105,341 A * | 4/1992 | Stephenson | H01G 9/08 29/25.03 |
| 5,587,869 A | 12/1996 | Azumi et al. | |
| 5,777,840 A | 7/1998 | Oney | |
| 6,952,339 B1 | 10/2005 | Knowles | |
| 7,274,551 B1 | 9/2007 | Parler, Jr. et al. | |
| 8,379,372 B2 | 2/2013 | Zednicek et al. | |
| 8,432,664 B2 | 4/2013 | Hirota et al. | |
| 9,059,373 B2 | 6/2015 | Chen et al. | |
| 2006/0240593 A1 | 10/2006 | Igaki et al. | |
| 2012/0069492 A1* | 3/2012 | Biler | H01G 9/0425 361/517 |
| 2014/0346046 A1 | 11/2014 | Andelman | |
| 2016/0172117 A1* | 6/2016 | Kubo | H01G 9/02 361/525 |

OTHER PUBLICATIONS

Gurevich, Electrolytic Capacitors: Design Features and Problems of the Choice, EIE, 2012, pp. 21-27, No. 4.

* cited by examiner

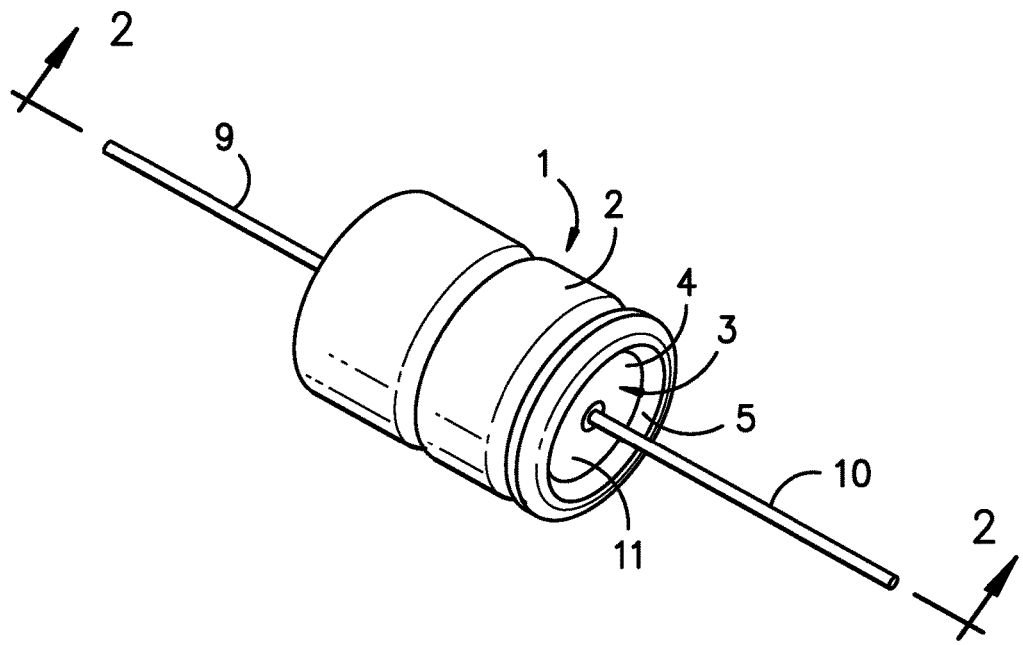
FIG. -1-
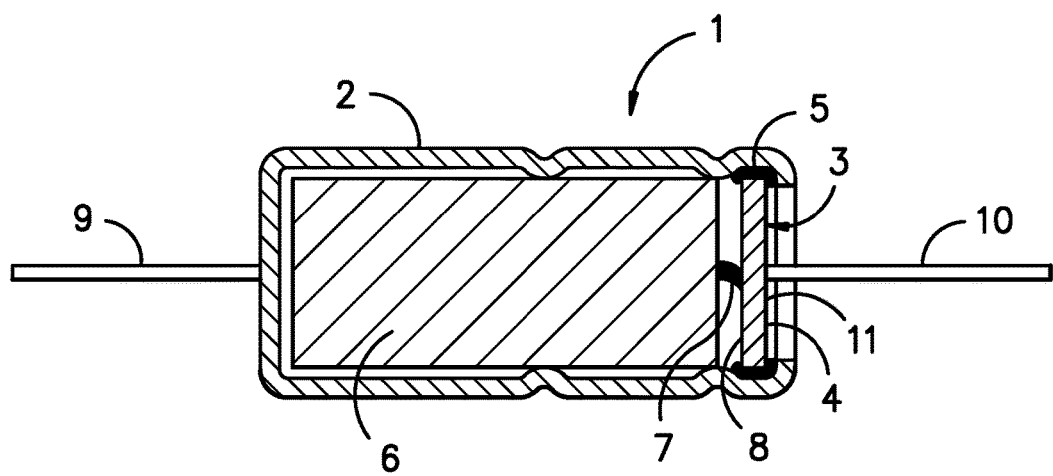
FIG. -2-

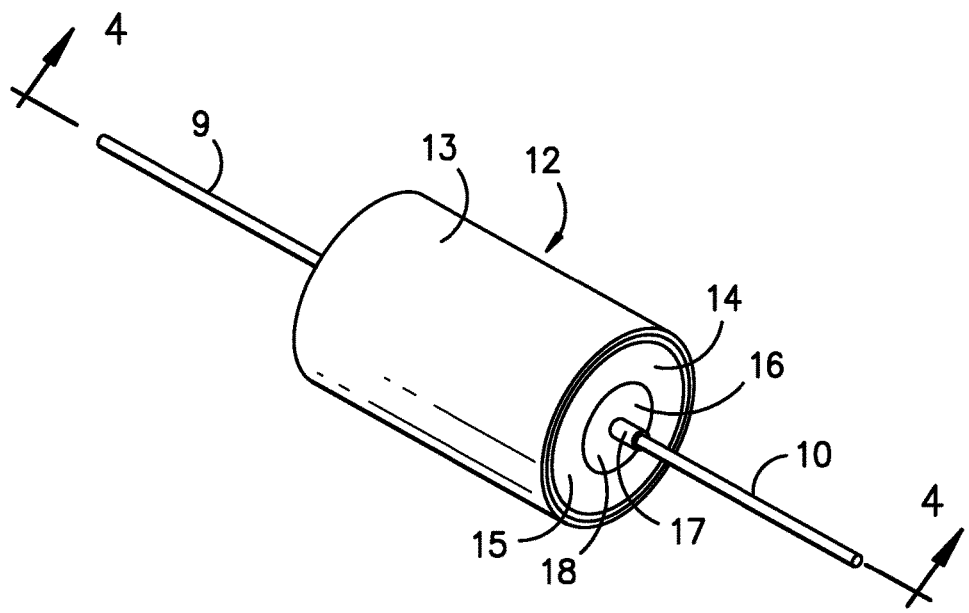
FIG. -3-
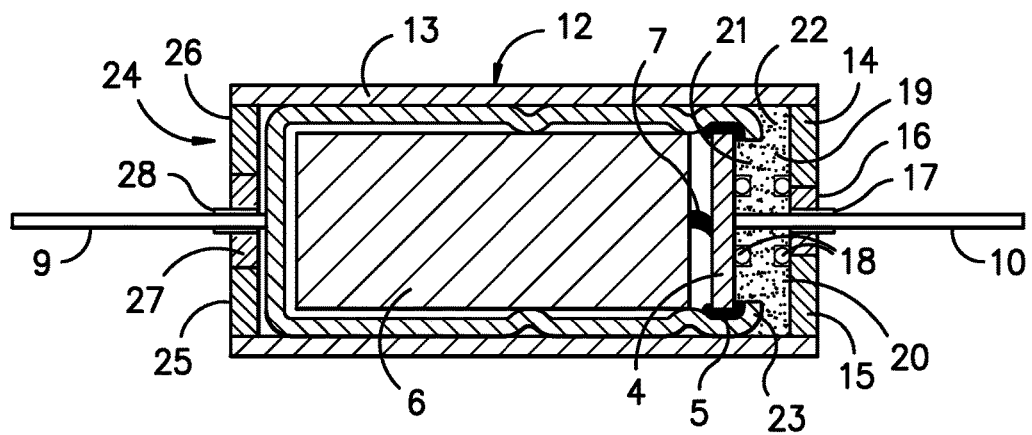
FIG. -4-

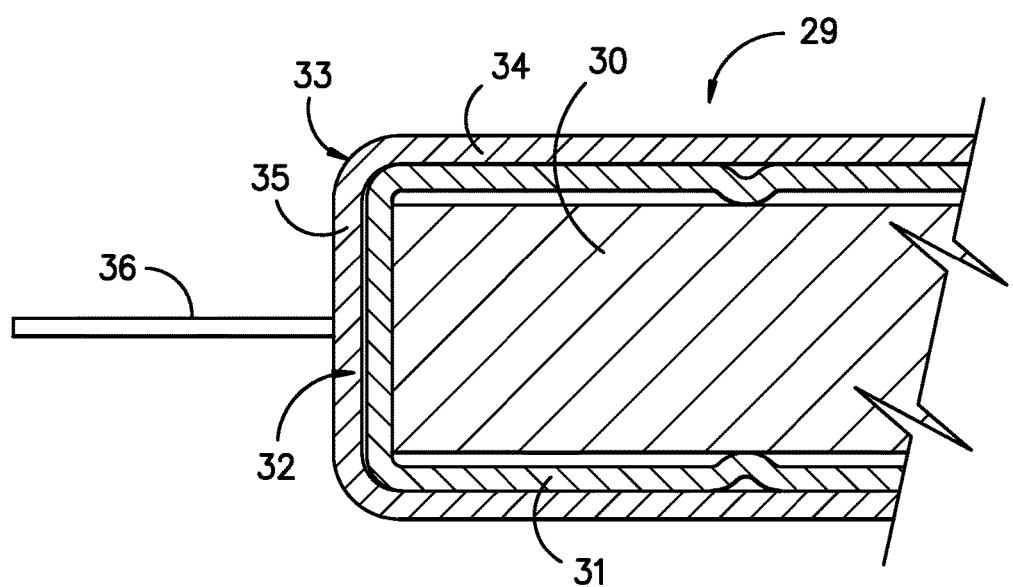
FIG. -5-

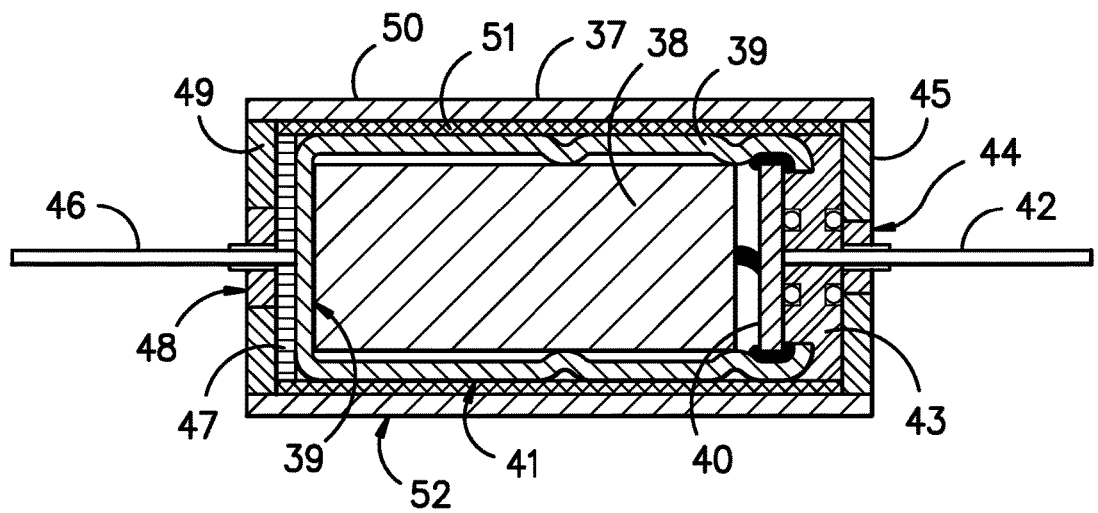
FIG. -6-
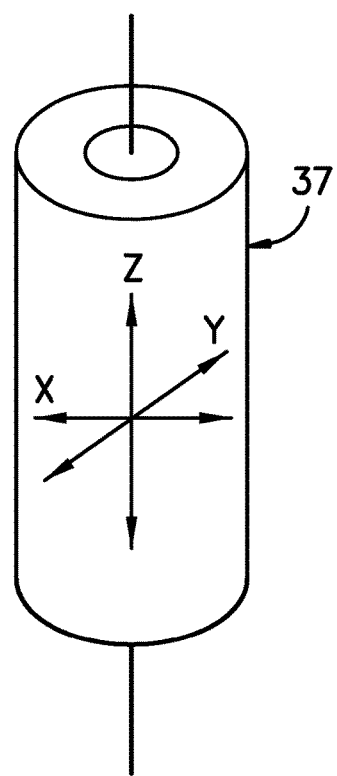
FIG. -7-

HERMETICALLY SEALED ELECTROLYTIC CAPACITOR WITH DOUBLE CASE

This invention is directed to an electrolytic capacitor having an inner case and an outer case, with a hermetic seal provided by the outer case.

BACKGROUND OF THE INVENTION

It is well known to provide electrolytic capacitors with a hermetic seal. Typical hermetic seals comprise an annular metal ring surrounding an inner glass disc. A metal post or tube for the lead of a terminal extends perpendicularly through the glass disc and is insulated by the glass from the annular metal ring. Various structures have been proposed to isolate the hermetic seal from the "wet" interior of the capacitor containing the electrolyte, thereby preventing corrosion and degradation of performance.

Smith—U.S. Pat. No. 3,293,507 discloses a capacitor having an inner case with a bung inserted in the opening (mouth). The opening of the inner case is crimped inwardly against the sides of the bung to create a seal. The anode terminal extends through the bung and through the hermetic seal positioned in the outer case.

Langer—U.S. Pat. No. 4,254,775 discloses an assembly of batteries and capacitors in a first chamber, which is isolated from a second chamber by a hermetic seal.

Parler et al.—U.S. Pat. No. 7,274,551 B1 disclose a capacitor having a lid with a chamber therein. A hermetic seal is seated on the "dry" side of the chamber and a terminal is positioned on the "wet" side of the chamber and insulated from the lid by an elastomeric ring.

Despite prior art developments, there remains a need for an electrolytic capacitor with extended reliability at higher operating temperatures, expressed as "hours per temperature." For example, relatively high operating temperatures, such as 125° C. or greater, can decrease the service life of a capacitor by accelerating drying out of the electrolyte. Furthermore, such operating temperatures can give rise to increased pressure within the capacitor, which in turn can lead to seal failure, corrosion and loss of electrolyte. Additionally, relatively high operating temperatures can also damage the components of the capacitor element, such as the paper spacer typically provided between layers of foil.

SUMMARY OF THE INVENTION

An electrolytic capacitor having an extended service life, especially at relatively high operating temperatures, is provided, as well as a method of manufacturing such a capacitor. Also within the scope of the invention is to provide a kit, employing an outer case, for converting a single-case electrolytic capacitor to a hermetically sealed capacitor for high temperature applications.

The capacitor is comprised of an inner case, containing the capacitor element and electrolyte solution, and an outer case, which incorporates a hermetic seal and resists outward expansion of the inner capacitor, thereby preventing seal failure and performance degradation.

The inner case has a body, with an opening at one end, and an inner cap sealing the opening. The inner cap may be electrically insulated from the inner case body by a gasket interposed between the circumference of the inner cap and the case body. The seal created by the gasket prevents the electrolyte from leaking or outgassing. In one embodiment of the invention, the opening of the inner case body defines a lip, which is rolled inward over the circumference of the inner cap and over the gasket, to resist outward movement of the inner cap, for example, if pressure builds inside the inner case. In various embodiments of the invention, the inner case body and cap are metal, particularly a valve metal, and more particularly aluminum.

The capacitor element comprises an anode, a terminal electrically connected to and extending from the anode, and a cathode in electrical contact with the inner case body. In one embodiment of the invention, the anode and cathode are wound sheets separated by an inert sheet, which may be a polymer capable of maintaining its integrity and performing at temperatures of 175° C. or greater, or even 200° C. or greater, such as an aromatic polyamide sheet. An electrolyte solution is contained in the inner case and in contact with the capacitor element.

The inner cap may be electrically conductive, and the anode terminal can be electrically connected to the interior side of the inner cap, and a lead can be electrically connected to the exterior side of the inner cap. The connections may be made by welding the anode terminal and anode lead, to the respective sides of the inner cap. Accordingly, an electric current can flow from inside the inner case to outside the inner case, without having to provide a passageway or opening through the inner cap for an electric conductor, such as a wire.

An outer case incorporating a hermetic seal is placed over the inner case. The outer case has a sleeve that surrounds the inner case body. The sleeve has an opening oriented in the direction of the opening in the inner case body and an outer cap, which overlays and seals the opening in the sleeve. The sleeve may be a receptacle having an opening at one end only. The cathode lead may attached to the outer case, at a location where an electrical connection may be made to the cathode through the inner case to the outer case.

The cathode lead may be attached to the body of the inner case, for example, at the bottom of the body, opposite the inner cap. The outer case sleeve may have a first opening oriented in the direction of the opening in the inner case and a second opening opposite the first opening, wherein the second opening in the sleeve may be sealed by attaching a second cap, referred to herein as a "base cap."

Also within the scope of the invention is to provide insulation between the inner case and the outer case, such as with a non-conductive polymer coating or sheet interposed between the body of the inner case and sleeve of the outer case, as well as non-conductive spacers and discs between the inner case and the outer cap and base cap of the outer case.

The outer cap has an annular ring and a hermetic seal positioned within the annular ring. The hermetic seal includes a glass disc surrounding an electrical conductor, such as a metal post to which the anode lead may be welded or soldered, or a tube through which the anode lead may be inserted and sealed, for example by welding or soldering. If a base cap is employed, it may be provided with a hermetic seal and electrically connected to a cathode lead extending from the bottom of the inner case body, as described with regard to the anode lead.

An insulating spacer is provided between the inner cap and the outer cap, wherein the spacer has an exterior side abutting the annular ring of the outer cap and an interior side abutting the inner cap, wherein the spacer resists movement of the inner cap toward the outer cap. The spacer may be a high-modulus, non-conductive polymer, for example, PTFE, PEEK, or PPA. The spacer may be provided with a flange that overlays the lip of the inner case body and is sandwiched between the lip and the annular ring of the outer cap, thereby reinforcing the circumferential seal between the inner case body, gasket and inner cap.

The outer case can be made entirely of metal, except for the hermetic seal(s). By way of example, the outer case may be a metal having a Rockwell hardness of 24 or greater. By way of further example, the outer case may be steel, in particular stainless steel, titanium, or tantalum. The outer case may be secured in place by welding, in particular, laser welding or high temperature welding. In one embodiment of the invention, axial compression is applied, that is, perpendicular to the outer cap, to compress the spacer between the outer cap and the inner case, while the components of the outer case are welded. If a base cap is provided, axial compression may be applied, that is, perpendicular to the base cap, while the base cap is welded to the outer case sleeve. The compression applied during assembly minimizes slack between the inner case and the outer case, which might otherwise allow the inner case to expand or distort under pressure.

The present invention features electrolytic capacitors having a service life of 2,000 hours or more at a temperature of 175° C., or even 2,000 hours or more at a temperature of 200° C. Another feature of the invention is that the outer case may be constructed to restrain expansion of the inner case in the direction of x, y and z axes.

BRIEF DESCRIPTION OF THE DRAWINGS

FIG. 1 is a side perspective view of the inner case of the double case capacitor.

FIG. 2 is a side sectional view of the inner case taken along section line 2-2 of FIG. 1.

FIG. 3 is a side perspective view of the outer case of the capacitor.

FIG. 4 is a side sectional view of the capacitor taken along section line 4-4 of FIG. 3.

FIG. 5 is a side sectional view of an embodiment of the invention having the cathode lead connected to the bottom of the outer case.

FIG. 6 is a side sectional view of an embodiment of the invention wherein the outer case is electrically insulated from the inner case.

FIG. 7 is a schematic drawing of the capacitor showing its orientation relative to three-dimensional space represented by the x, y and z axes.

DETAILED DESCRIPTION OF THE INVENTION

Without intending to limit the scope of the invention, the preferred embodiments and features are hereinafter set forth. All of United States patents and published applications cited in the specification are incorporated herein by reference. Unless otherwise indicated, conditions are 25° C., 1 atmosphere of pressure, and 50% relative humidity. The term "polymer" or "polymeric" as used in the present application denotes a material having a weight average molecular weight ($M_w$) of at least 5,000. The melting temperature of polymers is determined by DSC and reported as $T_m$ for crystalline and semi-crystalline polymers and $T_g$ for amorphous polymers.

Inner Case and Capacitor Element

Referring to FIGS. 1 and 2, inner case 1 has body 2 with opening 3, which is sealed by inner cap 4 and gasket 5. Gasket 5 is capable of electrically insulating inner cap 4 from body 2 of inner case 1. Gasket 5 may be an elastomeric ring. The elastomeric ring is selected from an elastomer that is resistant to chemical attack by the electrolyte solution and has sufficient dielectric strength to withstand the maximum voltage generated by the capacitor. In one embodiment, the elastomer is required to perform over a temperature range of −55° C. to 200° C., without degradation or loss of elasticity. Examples of elastomers that may be employed include butyl rubber, chlorobutyl rubber, ethylene propylene rubber (EPR), ethylene propylene diene rubber (EPDM), fluoroelastomers, such as Viton®, polytetrafluoroethylene, such as Teflon®, polychloroprene rubber, such as Neoprene®, butadiene rubber, nitrile rubber, isoprene rubber, silicone rubber and styrene butadiene rubber.

Inner case 1 is made from a material that is substantially impermeable to gases. By way of example, the inner case may be made out of metal, in particular, a valve metal, for example, aluminum, tantalum, titanium and niobium. Body 2 and inner cap 4 of inner case 1 may be the same or different material.

Inner case 1 is illustrated as being cylindrical, but may be provided in other three-dimensional geometric shapes, as is known in the art. For example, inner case 1 may be in the shape of a rectangular prism, sometimes referred to as a "flatpack."

Capacitor element 6 is positioned inside the case. The capacitor element is made up of an anode, a cathode, a dielectric and an electrolyte solution, forming a capacitor capable of supporting a direct current potential, and thereby storing an electrical charge and energy. The anode is a valve metal upon which resides a dielectric, which is generally grown from the base metal in an anodizing electrochemical bath. The anode metal contacts the dielectric on its positively charged side, and the electrolyte contacts the dielectric on its negatively-charged side and conveys the charge to the cathode. The potentials of the anode and cathode may be conducted to positive and negative terminals, respectively, by means of a tab, wire or other metallic conductor.

Referring to FIG. 2, anode terminal 7 electrically connects the anode to the interior side 8 of inner cap 4. With respect to the cathode, body 2 of inner case 1 may be used for the negative terminal. Accordingly, cathode lead 9 may be electrically connected to the exterior of body 2, for example, by attaching cathode lead 9 to the bottom of body 2, opposite inner cap 4. Anode lead 10 is electrically connected to the exterior 11 of inner cap 4. The electrical connections may be made by welding, soldering, or brazing. It can be understood that when inner cap 4 is electrically conductive and anode terminal 6 is attached to the interior side 8 of inner cap 4 and anode lead 10 is attached to the exterior side 11 of inner cap 4, the need to provide a passageway and seal through inner cap 4 is avoided. Alternatively, the anode terminal and anode lead may be electrically connected through the inner cap by a rivet or equivalent structure insulated from the inner cap by, for example, an elastomer, such as those disclosed with regard to gasket 5.

The anode is prepared from a valve metal. The anode need not be in a specific form, and may, for example be in the form of a plate, foil, pellets or a porous solid. Any of the forms may be treated to enhance their performance, as is known in the art. For examples, foils may be etched to increase their surface area, and pellets may be pressed and sintered to fuse the grains and maintain interstices. In the case of a polarized, wet electrolytic capacitor, the cathode may be the same or a different metal than the anode or a non-metal, and it is not required that the cathode be capable of forming an oxide. The form of the cathode is selected to be compatible with the anode, to meet the objective of creating a capacitor. This invention can be employed with both polarized and non-polarized wet electrolytic capacitors.

In one embodiment of the invention, the capacitor comprises an anode foil and a cathode foil separated by a spacer sheet, which are wound together to form the capacitor element. The spacer sheet may be selected based on its stability at relatively high operating temperatures and resistance to the electrolyte solution. By way of example, polymers having a melting temperature or decomposition temperature of 200° C. or above, in particular 250° C. or above, more particularly 300° C. or above, are believed to be advantageous. Suitable polymers include aromatic polyamides, such as meta-aramids and para-aramids, in particular, Twaron®, Kevlar® and Nomex®.

An electrolyte solution is provided in the case, in sufficient quantity to immerse the capacitor element. Generally, the electrolyte solution may be formed of solutes that ionize upon dissolution in a suitable solvent to create an electrically conductive medium. A liquid, electrolyte solution may be added to the capacitor, or the solute and solvent may be added separately to the capacitor, with dissolution occurring in situ. Examples of suitable solutes include organic acids and bases, and inorganic acids and bases. Examples of suitable solvents include water, ethylene glycol, dimethylformamide (DMF), N-methylformamide (NMF), and gamma-butyrolactone (GBL). Particularly useful electrolyte solutions include solutions of sulfuric acid, boric acid and ammonium adipate. The buildup of gas pressure in the capacitor may be reduced by providing a depolarizing agent in the electrolyte solution, such as p-nitrophenol or nitroacetophenone.

Outer Case

The capacitor of the present invention is hermetically sealed, which is defined as having a permeability to helium gas of $10^{-7}$ cc/second or less, at 25° C. and one atmosphere of differential pressure. The hermetic seal is an outer metal-glass-inner metal seal. The materials of construction of the hermetic seal are selected to provide compatible coefficients of thermal expansion, imperviousness to gas, and metal to glass adhesion.

The outer metal component of the hermetic seal comprises an annular ring surrounding the glass disc. Preferably, the outer metal component is formed of a unitary piece of metal. The hermetic seal may be formed by pouring molten glass within the annular band, with the inner metal component aligned in the center of the glass. The outer metal component may be made of the same or different material as the other metal components of the outer case. To guard against galvanic corrosion, the outer metal component of the seal is typically constructed out of the same metal as the outer cap and sleeve and is at the same electric potential as the outer cap.

The term "glass" is intended to encompass glass, for example, sodium glass, as well as ceramic materials that are capable of bonding to the outer metal and the inner metal components of the seal, and capable of forming a barrier that is impermeable to gas.

The inner metal component is surrounded by the glass, which insulates the inner metal from the outer metal. The inner metal component is electrically conductive and may be made out of the same or different metal as the other metal components of the lid. By way of example, the inner metal component may be a metal post. The metal post may be a solid rod or may be hollow. The metal post may be cylindrical, or it can have flat edges. For example, the metal post may have a square, pentagonal or hexagonal cross-section. In one embodiment, the metal post is a hollow tube. Ordinarily, such a post will be aligned perpendicular to the lid, but the precise angle may be varied, provided that the metal post is not in contact with the outer metal component of the seal and not in contact with the outer cap or sleeve of the outer case.

Referring to FIGS. 3 and 4, outer case 12 is shown surrounding inner case 1. Outer case 12 has sleeve 13, positioned around body 2 of inner case 1. Outer cap 14 of outer case 12 overlays inner cap 4, in spaced apart and substantially parallel orientation. Outer cap 14 has annular ring 15 and glass hermetic seal 16. Tube 17 positioned perpendicularly in the center of hermetic seal 16 and anode lead 10 passes through tube 17 and is sealed by soldering.

Spacer 19 is provided between inner cap 4 and outer cap 14. O-rings 18 are placed on either side of spacer 19, that is, between inner cap 4 and spacer 19 and between spacer 19 and outer cap 14. The O-rings may have the same composition as gasket 5.

Spacer 19 is a non-conductive material, which insulates inner cap 4 from outer case 12, in particular, from outer cap 14. Spacer 19 also resists movement of inner cap 4 toward outer cap 14, for example, when pressure builds inside of inner case 1. Accordingly, spacer 19 has an exterior side 20 adjacent annular ring 15 of outer cap 14, and spacer 19 has interior side 21 adjacent inner cap 4. In the embodiment of the invention shown in FIG. 4, spacer 19 has flange 22 overlaying lip 23 of inner case body 2. It can be understood that flange 22 resists upward movement of lip 23, which in turn maintains the seal around the circumference of inner cap 4.

While it is believed to be advantageous to provide spacer 19 with both flange 22, which engages the lip of inner case body 2, and a central core that directly overlays inner cap 4, a spacer having either one of the features may be employed. For example, an annular spacer positioned between the outer cap 14 and lip 23 may be used to restrict movement of the inner case toward the outer cap. Alternatively, the spacer may be a central disc abutting the inner cap on the inside and abutting the outer cap on the outside, and fitting within the circumference of lip 23, and having a perpendicular hole for the anode lead.

Spacer 19 may be selected from a non-conductive polymer. By way of the example, the polymer may have a Young's modulus of 0.125 GPa or greater, in particular, 0.25 GPa or greater. Suitable materials include polytetrafluoroethylene (PTFE), polyether ether ketone (PEEK) and polyphthalamide (PPA). Also within the scope of the invention is to provide a washer between the underside of flange 22 and lip 23, in particular a washer made of a material that is relatively more rigid than spacer 19, such as a metal, in particular a valve metal.

In the embodiment of the invention shown in FIGS. 1-4, the cathode lead 9 is attached to the bottom of body 2 of inner case 1. In order to seal the bottom 24 of the capacitor, base cap 25 is provided with a hermetic seal comprising annular metal ring 26, glass disc 27 and tube 28, corresponding in function to outer cap 14. Cathode lead 9 may be threaded through tube 28 and soldered to create a seal.

It can be understood that the electrolytic capacitor shown in FIGS. 1 and 2 can be provided as is, that is, without the outer case, for applications that do not require a hermetically sealed electrolytic capacitor. The anode and cathode leads are already attached to the inner cap and the body of the inner case, respectively. The electrolytic capacitor of FIGS.

1 and 2 can be converted to a hermetically sealed capacitor by packaging the inner case within the outer case, as described herein. In other words, the outer case of the present invention can be employed as a kit to convert a conventional, single-case electrolytic capacitor to a hermetically sealed capacitor suitable for high temperature applications.

Referring to FIG. 5, an alternative embodiment of the invention is shown. Capacitor 29 has element 30 within the body 31 of inner case 32. Outer case 33 has sleeve 34 with integrally formed bottom 35. Cathode lead 36 is attached to bottom 35 of sleeve 34, for example, by welding. Thus, an electrical connection is provided from the cathode of capacitor element 30 through body 31 of inner case 32 and sleeve 34 of outer case 33, to cathode lead 36.

Outer Case is Insulated from the Inner Case

FIG. 6 shows an embodiment of the invention whereby the outer case is electrically insulated from the inner case, in addition to the outer case hermetically sealing the electrolytic capacitor and restricting expansion of the inner case. Capacitor 37 has element 38 housed within body 39 and inner cap 40 of inner case 41. Anode lead 42 extends from the exterior side of inner cap 40, through spacer 43 and hermetic seal 44 of outer cap 45. Cathode lead 46 extends from the bottom of inner case 41 through insulating disc 47 and hermetic seal 48 of bottom cap 49 of sleeve 50. Sleeve 50 has insulating liner 51, which electrically insulates sleeve 50 of outer case 52 from body 39 of inner case 41.

Spacer 43, liner 51 and disc 47 of outer case 52 are made of a non-conductive material, for example, a non-conductive polymer listed herein as suitable for spacer 19. It can also be understood that liner 51 of sleeve 50 may be a relatively thin coating, which may not have the same performance requirements as spacer 43 and disc 47. By way of example, liner 51 may be a coating or sheet of from 1 to 10 mils thick. Liner 51 may be a non-conductive polymer, for example, a polyimide, such as Kapton®, or a polyester, such as PET. Other polymers having a melting temperature of 200° C. or greater or even 250° C. or greater, including polymers disclosed herein suitable for the spacer or spacer sheet in the capacitor element, may be employed. The liner may be deployed in the form of a coating, tape or shrink wrap.

Assembly of the Double Case Electrolytic Capacitor

The inner case of the electrolytic capacitor can be assembled by conventional methods, whether the cathode lead is attached directly to the body of the inner case, as shown in FIGS. 1-4 and 6, or whether the cathode lead is attached later to the bottom of the sleeve of the outer case, as shown in FIG. 5.

Capacitors of the present invention may be assembled according to the following steps. Base cap 25 is welded to sleeve 13 of outer case 12. Inner case 1, as shown in FIGS. 1 and 2, is inserted into sleeve 13, and cathode lead 9 is inserted through tube 28 in glass disc 27 of base cap 25. A first O-ring 18 is positioned on inner cap 4, followed by spacer 19. A second O-ring 18 is positioned on exterior side 20 of spacer 19. Next, outer cap 14 is positioned at the end of sleeve 13, whereby outer cap 14 can slide axially relative to sleeve 13, towards base cap 25 at the opposite of sleeve 13, and anode lead 10 is inserted through tube 17 of outer cap 14. Pressure is applied to outer cap 14 in the axial direction relative to sleeve 13, thereby compressing the O-rings 18 and urging spacer 19 towards inner cap 4. While pressure is continuously applied, outer cap 14 is welded to sleeve 13. Finally, all of the seams of outer case 12 are completely welded and sealed, and anode lead 10 and tube 17, and cathode lead 9 and tube 28, are sealed by soldering, respectively.

FIG. 7 illustrates the orientation of the electrolytic capacitor of the present invention, with regard to the x, y, and z axes. The x and y axes are in a plane perpendicular to the outer cap, that is, perpendicular to the axial alignment of the capacitor. The z axis is parallel to the axial alignment of the capacitor. A feature of the outer case of the present invention is that it restricts expansion of the inner case with respect to all three axes, that is, along both directions of each of the x, y and z axes.

Capacitor Life Testing

The "capacitor life" values, stated in a number of hours at a certain temperature, are determined using the following test procedure.

1. PURPOSE. This test is conducted for the purpose of determining the effects on the electrical and mechanical characteristics of a capacitor, resulting from exposure of the capacitor to an elevated temperature for a specified length of time, while the part is continually performing its operational function at its rated voltage.

2. APPARATUS: A chamber shall be used that will maintain the temperature of the capacitor being tested, at the required test temperature and tolerance (175±5° C. or 200±5° C.). Temperature measurements shall be made within 10 unobstructed inches from any one part or group of like parts under test. In addition, the temperature measurement shall be made at a position where the effects of heat generated by the parts have the least effect on the recorded temperature. Chamber construction shall minimize the influence of radiant heat on the parts being tested. Chambers that utilize circulating liquid as a heat exchanger, free-convection (gravity type) chambers, and circulating air chambers should be used providing that the other requirements of this test method are met. The employment of baffling devices and the coating of their surfaces with a heat-absorbing finish are permitted.

3. PROCEDURE.

3.1 Mounting. Capacitors shall be mounted by their normal mounting means. When groups of capacitors are tested simultaneously, the mounting distance between capacitors shall be at least ½" for the individual groups. Capacitors fabricated of different materials, which may have a detrimental effect on each other and alter the results of this test, shall not be tested simultaneously.

3.2 Test temperature. Capacitors shall be subjected to 175±5° C. (or 200±5° C.) for the period specified in 3.4.

3.3 Operating conditions. Voltage, based on the rated voltage of the capacitor, shall be applied to the capacitor during the test period specified in the capacitor life designation.

3.4 Length of test. Capacitors shall be subjected to the test conditions, as specified, with measurements at appropriate intervals (4.0).

4.0 MEASUREMENTS. The following measurements shall be made prior to placing the capacitor into service (original measurement), during, and after exposure, at the intervals set forth below.

Original measurements: Capacitance, ESR, DC Leakage Current, Visual Inspection,

1000 Hour Measurements: Capacitance, ESR, DC Leakage Current, Visual Inspection.

2000 Hour Measurements: Capacitance, ESR, DC Leakage Current, Visual Inspection.
3000 Hour Measurements: Capacitance, ESR, DC Leakage Current, Visual Inspection.
5.0 TEST PARAMETERS.
Visual Inspection: Visual inspection will be carried out under a maximum of 10× magnification.
Capacitance: The capacitance of the specimen shall be measured at or referred to an ambient temperature of 25° C. with a capacitance bridge at the frequency of 120 Hz. The inherent accuracy of the measurement shall be ±(0.5 percent+0.2 picofarad). Suitable measurement technique shall be used to minimize errors due to the connections between the measuring apparatus and the specimen. The alternating-current (ac) voltage actually impressed across the specimen shall be 1000 mV.
ESR: ESR shall be determined by a capacitance bridge. The instrument measurement accuracy shall be within ±2 percent.
DC Leakage Current: DC leakage shall be measured with the appropriate rated voltage (−0 Vdc/+3 Vdc) applied at 25±3° C. and at the applicable maximum high temperature of 175±3° C. (or 200±3° C.) for 5 minutes −0+30 seconds after the capacitor has reached the rated voltage across the terminals.
6.0 ACCEPTANCE CRITERIA. The capacitor being tested shall satisfy one or more of the following criteria:
Visual Inspection: There shall be no leakage of electrolyte from the outer case and no mechanical damage (deformity/bulging of the outer case, no terminal damage or separation from the body of the capacitor).
DC Leakage: The DC Leakage shall not exceed (a) 0.01× C×V (μA) at 25° C.; and 0.1×C×V (μA) at 175° C. Example: a 140 μF, 40 vdc rated capacitor shall have a DC leakage current at 25° C. of (0.01×140×40)=56 μA or less.
Capacitance: decrease of 10% or less relative to the original value.
ESR: increase of 200% or less relative to the original value.

An advantage of the present invention is that electrolytic capacitors having a life of 2,000 hours or more at a temperature of 175° C., or even 2,000 hours or more at a temperature of 200° C. may be provided.

There are, of course, many alternative embodiments and modifications of the invention, which are intended to be included within the following claims.

What we claim is:
1. An electrolytic capacitor, comprising:
   (a) an inner case having (i) a body having an opening at one end; and (ii) an inner cap sealing the opening in the inner case body, the inner cap having an interior side and an exterior side, wherein the inner cap is conductive and the inner cap is insulated from the inner case body by a gasket interposed between the inner cap and the inner case body; and (iii) wherein the opening in the body of the inner case defines a circumferential lip and the lip is rolled inward over the inner cap to create a seal;
   (b) a capacitor element positioned in the inner case body, the capacitor element comprising (i) an anode, (ii) a terminal extending from the anode, wherein the anode terminal is electrically connected to the interior side of the inner cap; (iii) a cathode in electrical contact with the inner case body; and (iv) a spacer sheet separating the anode and the cathode;
   (c) an electrolyte solution contained in the inner case body and in contact with the capacitor element;
   (d) an anode lead electrically connected to the exterior side of the inner cap;
   (e) an outer case comprising (i) a sleeve surrounding the inner case body having an opening at one end, wherein the opening in the sleeve is oriented in the direction of the opening in the inner case body; and (ii) and an outer cap attached to and overlaying the opening in the sleeve, wherein the outer cap comprises a hermetic seal having an annular ring surrounding a glass disc and an inner post extending through the glass disc and insulated from the annular ring, wherein the inner post is a solid rod electrically connected to the anode lead or a hollow tube through which the anode lead is inserted;
   (f) an insulating spacer positioned between the inner cap and the outer cap, wherein the spacer has an exterior side abutting the annular ring of the outer cap and an interior side abutting the inner case, wherein the spacer resists movement of the inner case toward the outer cap, and wherein the spacer further comprises a flange, which overlays the lip of the inner case body and is positioned between the lip and the annular ring of the outer cap; and
   (g) a cathode lead electrically connected to the inner case body and extending from the outer case.

2. The capacitor of claim 1, wherein the spacer has a Young's modulus of 0.25 GPa or greater.

3. The capacitor of claim 1, wherein the capacitor is an aluminum capacitor having a DC leakage that does not exceed (a) 0.01×C×V (μA) at 25° C., and 0.1×C×V (μA) at 175° C. after 2,000 hours at 175° C.

4. The capacitor of claim 1, wherein the outer case is stainless steel.

5. The capacitor of claim 1, wherein the outer case restricts expansion of the inner case in the x, y and z axes.

6. The capacitor of claim 1, further comprising a cathode lead extending from the inner case body, and wherein the sleeve of the outer case further comprises a base cap positioned at an opposite end of the sleeve from the outer cap, wherein the base cap comprises a hermetic seal having an annular ring surrounding a glass disc and an inner post extending through the glass disc and insulated from the annular ring, wherein the inner post is a solid rod electrically connected to the cathode lead or is a hollow tube through which the cathode lead is inserted.

7. The capacitor of claim 6, wherein the outer case is electrically insulated from the inner case, except where the anode lead and cathode lead are electrically conducted through the outer cap and base cap hermetic seals.

8. The capacitor of claim 1, wherein the capacitor is the product of the process of applying axial compression to the outer cap and welding the outer cap to the outer case sleeve while the outer cap, spacer and inner case are compressed against a bottom of the outer case.

9. The capacitor of claim 1, further comprising a first O-ring compressed between the outer cap and exterior side of the spacer and a second O-ring compressed between the interior side of the spacer and the exterior side of the inner cap.

10. The capacitor of claim 1, wherein the sleeve of the outer case restricts expansion of the body of the inner case in the x and y axes.

11. An electrolytic capacitor, comprising:
   (a) an inner case having (i) a body having an opening at one end, and (ii) an inner cap sealing the opening in the inner case body, the inner cap having an interior side and an exterior side, wherein the inner cap is conductive and the inner cap is insulated from the inner case body by a gasket interposed between the inner cap and the inner case body;

(b) a capacitor element positioned in the inner case body, the capacitor element comprising (i) an anode, (ii) an anode terminal, (iii) a cathode electrically connected to the inner case body, (iv) a dielectric, and (v) an electrolyte solution, wherein the capacitor element is capable of storing an electrical charge;

(c) an anode lead extending outward from the exterior side of the inner cap, wherein the anode lead is electrically connected to the anode terminal;

(d) an outer case comprising (i) a sleeve surrounding the inner case body having an opening at one end, wherein the opening in the sleeve is oriented in the direction of the opening in the inner case body; (ii) and an outer cap attached to and overlaying the opening in the sleeve, wherein the outer cap comprises a hermetic seal having an annular ring surrounding a glass disc and an inner post extending through the glass disc and insulated from the annular ring, wherein the inner post is a solid rod electrically connected to the anode lead or a hollow tube through which the anode lead is inserted; and (iii) a base cap positioned at an opposite end of the sleeve from the outer cap, wherein the base cap comprises a hermetic seal having an annular ring surrounding a glass disc and an inner post extending through the glass disc and insulated from the annular ring, wherein the inner post is a solid rod electrically connected to the cathode lead or is a hollow tube through which the cathode lead is inserted, wherein the outer case restricts expansion of the inner case in the x, y and z axes;

(e) an insulating spacer positioned between the inner cap and the outer cap, wherein the spacer has an exterior side abutting the annular ring of the outer cap and an interior side abutting the inner case, wherein the spacer resists movement of the inner case toward the outer cap; and (f) a cathode lead electrically connected to and extending from the inner case body and extending from the outer case.

12. The capacitor of claim 11, wherein the outer case is electrically insulated from the inner case, except where the anode lead and cathode lead are electrically conducted through the outer cap and base cap hermetic seals.

13. The capacitor of claim 11, wherein the capacitor has a DC leakage that does not exceed (a) $0.01 \times C \times V$ ($\mu A$) at 25° C., and $0.1 \times C \times V$ ($\mu A$) at 175° C. after 2,000 hours at 200° C.

14. The capacitor of claim 11, wherein the capacitor is the product of the process of applying axial compression to the outer cap and welding the outer cap to the outer case sleeve while the outer cap, spacer and inner case are compressed against a bottom of the outer case.

15. An electrolytic capacitor, comprising:

(a) an inner case having (i) a body having an opening at one end, and (ii) an inner cap sealing the opening in the inner case body, the inner cap having an interior side and an exterior side, wherein the inner cap is conductive and the inner cap is insulated from the inner case body by a gasket interposed between the inner cap and the inner case body;

(b) a capacitor element positioned in the inner case body, the capacitor element comprising (i) an anode, (ii) an anode terminal, (iii) a cathode electrically connected to the inner case body, (iv) a dielectric, and (v) an electrolyte solution, wherein the capacitor element is capable of storing an electrical charge;

(c) an anode lead extending outward from the exterior side of the inner cap, wherein the anode lead is electrically connected to the anode terminal;

(d) an outer case comprising (i) a sleeve surrounding the inner case body having an opening at one end, wherein the opening in the sleeve is oriented in the direction of the opening in the inner case body; (ii) and an outer cap attached to and overlaying the opening in the sleeve, wherein the outer cap comprises a hermetic seal having an annular ring surrounding a glass disc and an inner post extending through the glass disc and insulated from the annular ring, wherein the inner post is a solid rod electrically connected to the anode lead or a hollow tube through which the anode lead is inserted; and (iii) a base cap positioned at an opposite end of the sleeve from the outer cap, wherein the base cap comprises a hermetic seal having an annular ring surrounding a glass disc and an inner post extending through the glass disc and insulated from the annular ring, wherein the inner post is a solid rod electrically connected to the cathode lead or is a hollow tube through which the cathode lead is inserted, wherein the outer case restricts expansion of the inner case in the x, y and z axes;

(e) an insulating spacer positioned between the inner cap and the outer cap, wherein the spacer has an exterior side abutting the annular ring of the outer cap and an interior side abutting the inner case, wherein the spacer resists movement of the inner case toward the outer cap;

(f) a cathode lead electrically connected to and extending from the inner case body and extending from the outer case; and (g) a first O-ring compressed between the outer cap and exterior side of the spacer and a second O-ring compressed between the interior side of the spacer and the exterior side of the inner cap.

* * * * *